US011660606B2

(12) United States Patent
Urbinatti (10) Patent No.: US 11,660,606 B2
(45) Date of Patent: May 30, 2023

(54) SYSTEM AND METHOD FOR MONITORING MOVEMENT OF A CRUSHER HEAD (71) Applicant: Metso Minerals Industries, Inc., Waukesha, WI (US)

(72) Inventor: Victor G. Urbinatti, Waukesha, WI (US)

(73) Assignee: Metso Outotec USA Inc., Brookfield, WI (US)

( * ) Notice: Subject to any disclaimer, the term of this patent is extended or adjusted under 35 U.S.C. 154(b) by 0 days.

(21) Appl. No.: 16/916,314

(22) Filed: Jun. 30, 2020

(65) Prior Publication Data

US 2021/0402412 A1 Dec. 30, 2021

(51) Int. Cl.
*B02C 2/04* (2006.01)
*B02C 2/10* (2006.01)
*G01D 5/14* (2006.01)
*B02C 25/00* (2006.01)

(52) U.S. Cl.
CPC ............... *B02C 25/00* (2013.01); *B02C 2/04* (2013.01); *B02C 2/10* (2013.01); *G01D 5/14* (2013.01)

(58) Field of Classification Search
CPC .... B02C 2/04; B02C 2/10; B02C 2/47; B02C 25/00; G01D 5/14
See application file for complete search history.

(56) References Cited

U.S. PATENT DOCUMENTS

| 4,272,030 A | 6/1981 | Afanasiev et al. | |
| 2008/0041994 A1* | 2/2008 | Hall | B02C 2/005 241/207 |
| 2009/0259434 A1* | 10/2009 | Loyer | B02C 2/06 702/159 |

(Continued)

FOREIGN PATENT DOCUMENTS

| AU | 2009251850 B2 | 9/2014 |
| CN | 104907155 A | 9/2015 |

(Continued)

OTHER PUBLICATIONS

English translate (FR2463640A3), retrieved date Nov. 11, 2021.*

(Continued)

*Primary Examiner* — Shelley M Self
*Assistant Examiner* — Mohammed S. Alawadi
(74) *Attorney, Agent, or Firm* — Andrus Intellectual Property Law, LLP (57) ABSTRACT

A system for monitoring at least one motion parameter of the main shaft of a gyratory or cone crusher. The system includes a sensor, such as a magnetometer, positioned within close proximity to a magnetic element, such as a lifting lug, formed on a top end of the main shaft. When the main shaft rotates or moves vertically, the movement creates a change in the magnetic flux, which is sensed by the magnetometer. The change in the magnetic flux is sensed by the magnetometer and an output signal is generated. A controller receives the output signal and determines at least one motion parameter based upon the detected changes in the magnetic (Continued)

flux. In one embodiment, a permanent magnet can be the magnetic element or can be inserted into the lifting lug to enhance the magnetic flux changes caused by the rotational movement or vertical movement of the main shaft.

14 Claims, 6 Drawing Sheets

(56) References Cited

U.S. PATENT DOCUMENTS

| | | | |
|---|---|---|---|
| 2009/0294559 A1* | 12/2009 | Eriksson | B02C 2/007 |
| | | | 241/207 |
| 2014/0333310 A1 | 11/2014 | Lozinsky et al. | |

FOREIGN PATENT DOCUMENTS

| | | | | |
|---|---|---|---|---|
| EP | 0606942 A1 | 7/1994 | | |
| EP | 2881176 A1 | 6/2015 | | |
| FR | 2463640 A3 * | 2/1981 | | B02C 2/042 |
| FR | 2463640 A3 | 2/1981 | | |

OTHER PUBLICATIONS

What-is-an-Inductive-Sensor, retrieved date Sep. 16, 2022. https://www.azosensors.com/article.aspx?ArticleID=411.*

Stainless-Steel Lug, retrieved ate Sep. 16, 2022. https://www.amazon.com/Stainless-Machinery-Shoulder-Lifting-Eyebolts/dp/B07SV2LKVP/ref=sr_1_3?crid=2H2YY15RBSOHN&keywords=Lifting+lug&qid=1663374106&sprefix=lifting+lug%2Caps%2C76&sr=8-3.*

International Search Report and Written Opinion for International Application No. PCT/US2021/039774, dated Oct. 27, 2021.

* cited by examiner

FIG. 7

SYSTEM AND METHOD FOR MONITORING MOVEMENT OF A CRUSHER HEAD

BACKGROUND

The present disclosure is generally related to a system and method for monitoring of main shaft rotation which is also referenced as "head spin" and the vertical position of the main shaft within the crusher. More specifically, the present disclosure is related to a method and system for monitoring head spin and the vertical position of the main shaft to assess the operation health of the crusher when the crusher is idling and/or crushing material.

In a crusher, more specifically a primary gyratory crusher, the main shaft rotates as the crusher is idling and when the crusher is crushing incoming feed material. Main shaft/head spin can be utilized to assess the operational health of the machine when the crusher is idling and/or crushing.

During idling, the typical observed value of the head spin is about 5 to 20 RPMs but this value can be impacted by different factors. One major factor that affects head spin is the fit between the spider bushing and the main shaft upper journal. If the spider bushing starts to lose the friction fit with the main shaft upper journal, the reduction in friction between these components and in turn the main shaft/head spin can become elevated beyond the observed "baseline".

If the head spin is monitored and compared to a baseline value measured during normal operation with the crusher in a desired condition, it is possible to determine when the spider bushing is become worn. Further, by monitoring head spin relative to the baseline value other components that can contribute to a change in head spin such as the dust seal and the fit between the main shaft lower journal and the eccentric bushing, can be analyzed for wear. In addition, head spin can also be potentially impacted by the weight of the mantle. Since the weight of the mantle can change over time as the mantle becomes worn, a minor change in head spin could also indicate and potentially allow for the monitoring of mantle wear life.

SUMMARY

By monitoring head spin, the present disclosure will allow for greater visibility on the operational health of a gyratory crusher which will help to prevent unplanned downtime and to minimize production losses.

In addition to monitoring head spin, the system and method of the present disclosure will allow for the monitoring of the vertical displacement of the main shaft in relationship to the crusher. By monitoring the vertical displacement of the main shaft, this present disclosure will allow for the detection of main shaft jumps which have a negative impact on the overall operational health of the crusher. By monitoring the vertical position, the present disclosure will allow for the potential deletion of the existing sensor that is utilized to monitor the position of the main shaft, which is done by monitoring the MPS piston.

The method and system of the present disclosure utilizes magnetic flux deviations caused by the moving crusher head to identify the rotation and location of the moving crusher head. A magnetic sensor, such as a magnetometer, is utilized to detect changes in the magnetic flux. The data generated by a magnetic sensor can be interpreted by a controller to provide an analysis of main shaft head spin and vertical displacement.

In accordance with an exemplary embodiment of the present, a magnetic element is mounted to a top end of the main shaft, which can be sensed by the magnetic sensor. In one exemplary embodiment, the magnetic element is the lifting lug that is found on top of the main shaft. The lifting lug is formed from a ferromagnetic metallic material. The lifting lug is typically used for lifting the main shaft during assembly of the crusher. The lifting lug has a rectangular shape that is sufficient to disrupt the magnetic flux in a way that a magnetometer will be able to identify the rotation and location of the lifting lug and associated main shaft. In an exemplary embodiment of the present disclosure, the lifting lug is located within a spider bushing cavity during operation of the crusher. The spider bushing cavity is surrounded by metal such that the spider bushing cavity will act as a "Faraday's cage" and prevent magnetic/electrical interference from impacting the reading by the magnetometer. Although the lifting lug is one type of magnetic element, different masses of a ferromagnetic material could be attached to the top end of the main shaft. Such mass of material could also be sensed by the magnetometer in the same way as the lifting lug.

In another contemplated exemplary embodiment of the present disclosure, if a stronger magnetic field is required to improve sensing, the magnetic element could include a permanent magnet installed on the top end of the main shaft either alone or in combination with the lifting lug. In an embodiment in which the magnetic element includes both the lifting lug and the permanent magnet, the permanent magnet could be fit into the existing hole formed in the lifting lug. The hole in the lifting lug is currently utilized to install the shackle when lifting the main shaft. If a permanent magnet is utilized, it will be installed within the lifting lug after the main shaft is installed into the crusher.

The magnetometer utilized in the present disclosure is able to sense the changes in the magnetic field generated by a rotating main shaft. The rotation of the main shaft will cause the magnetic element to create a disruption in a magnetic flux. The change in the magnetic flux will translate into an output signal generated by the magnetometer. The output signal from the magnetometer can in turn be interpreted to provide a representation of main shaft head spin and/or the vertical displacement of the main shaft.

In accordance with the present disclosure, the utilization of magnetic flux caused by changes in the magnetic field is used to monitor the location and rotation of the crusher "head". The method and system of the present disclosure can be retrofit to existing crushers and will be able to withstand the punishing environment that these crushers are subjected to. The ability to monitor main shaft/head spin has been something desired for many years and the present disclosure solved this challenge in addition to allowing for the monitoring of main shaft jump.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
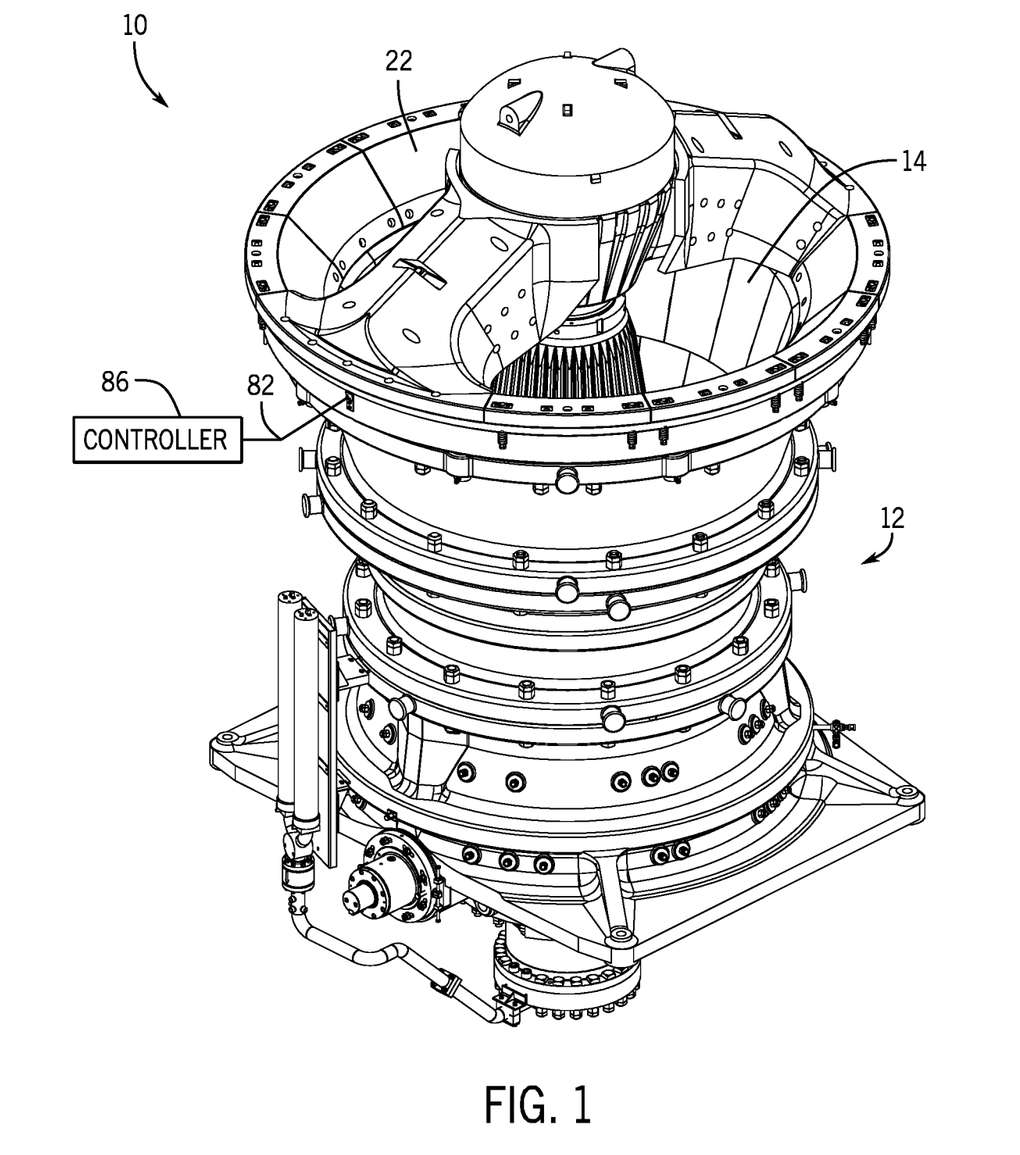
FIG. 1 is a perspective, assembled view of a gyratory crusher that includes a spider and the monitoring system of the present disclosure.
Figure 2:
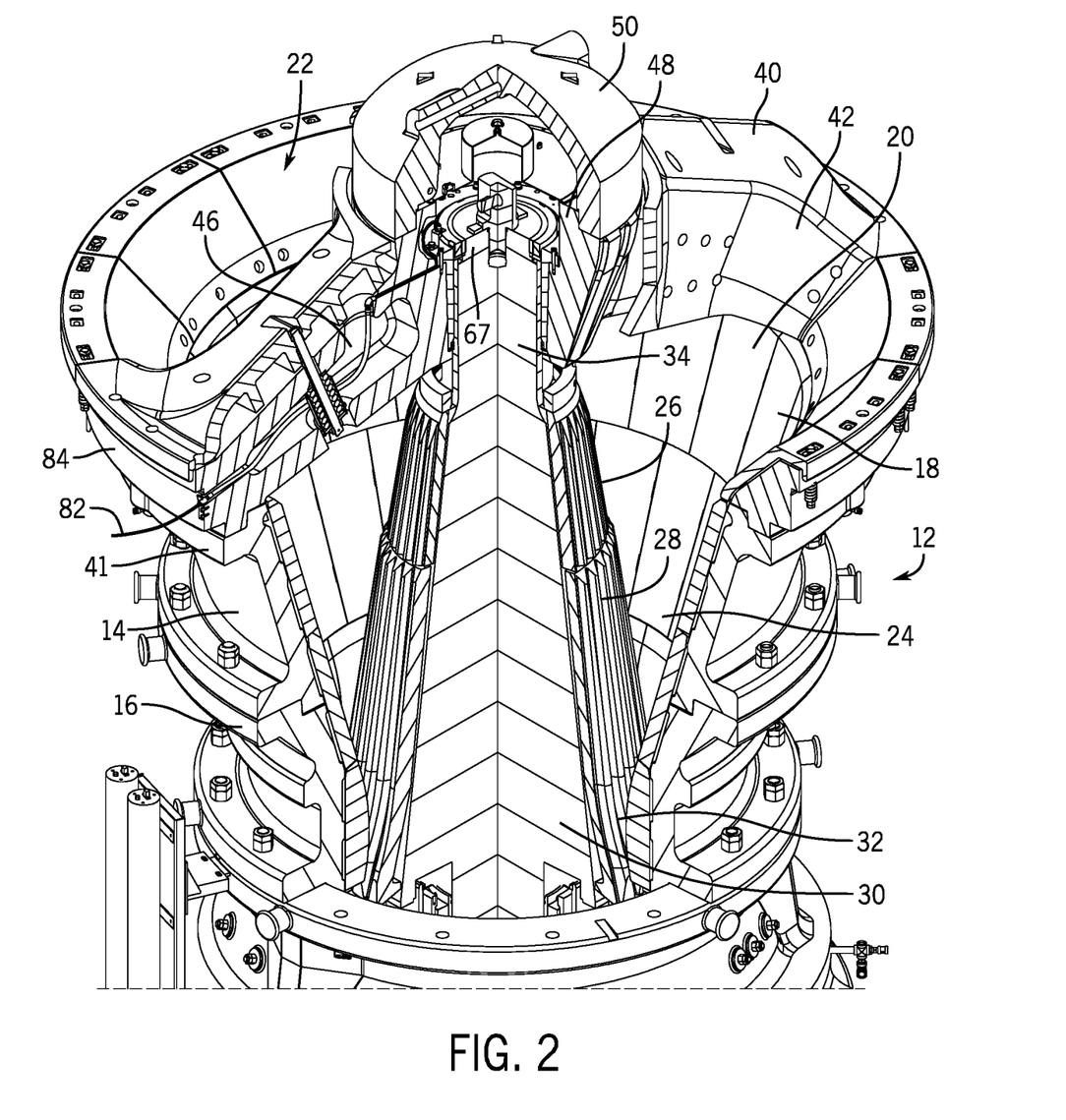
FIG. 2 is a partial section view of the gyratory crusher.

FIGS. 1 and 2 generally illustrate a gyratory rock crusher 10 constructed in accordance with the present disclosure. As can be seen in FIG. 2, the gyratory rock crusher 10 includes a shell assembly 12 that is formed from an upper top shell 14 joined to a lower top shell 16. The top shells 14, 16 support a series of concaves 18 that are positioned along the inner surface of the shell assembly 12 to define a generally tapered frustoconical inner surface 20 that directs material from an open top end 22 downward through a converging crushing cavity 24 formed between the inner surface 20 defined by the row of concaves 18 and an outer surface 26 of a frustoconical mantle 28 positioned on a gyrating main shaft 30. Material is crushed over the height of the crushing cavity 24 between the inner surface 20 and the outer surface 26 as the main shaft 30 gyrates, with the final crushing occurring within the crushing gap 32.

Figure 3:
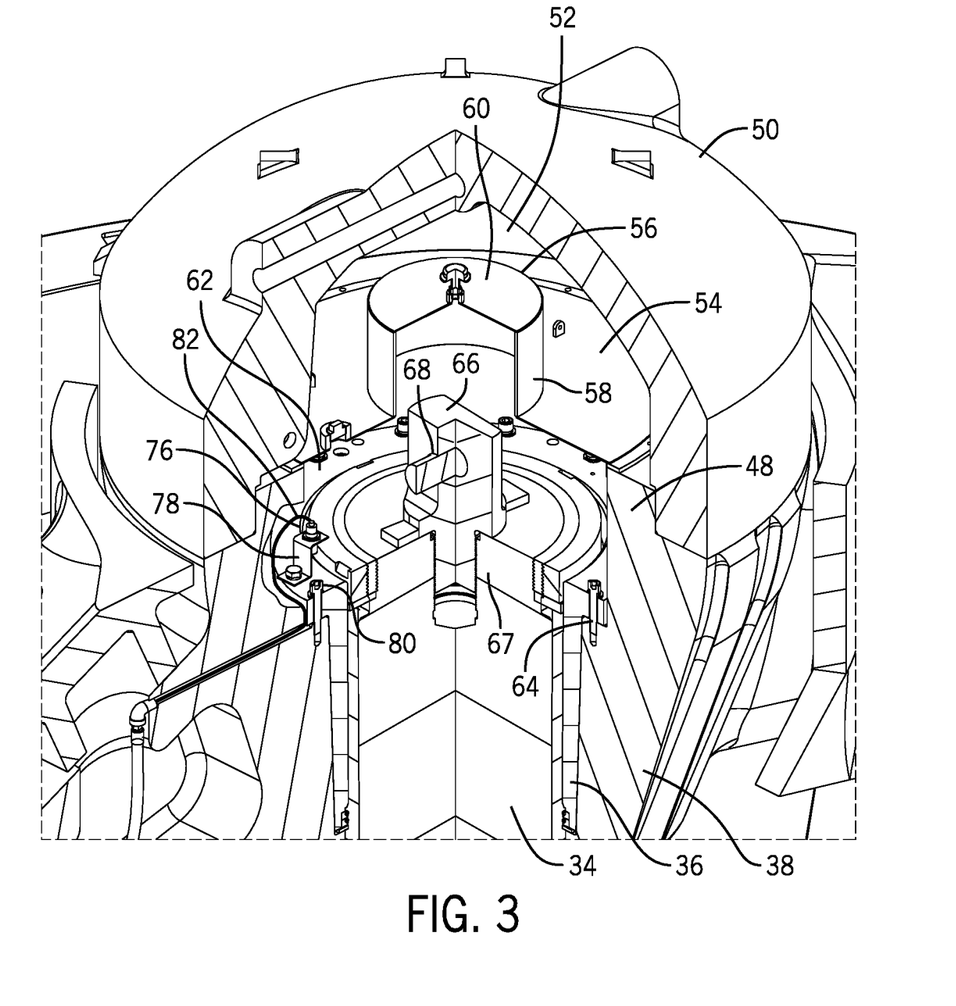
FIG. 3 is a magnified view showing the crusher head monitoring system of the present disclosure.
Figure 4:
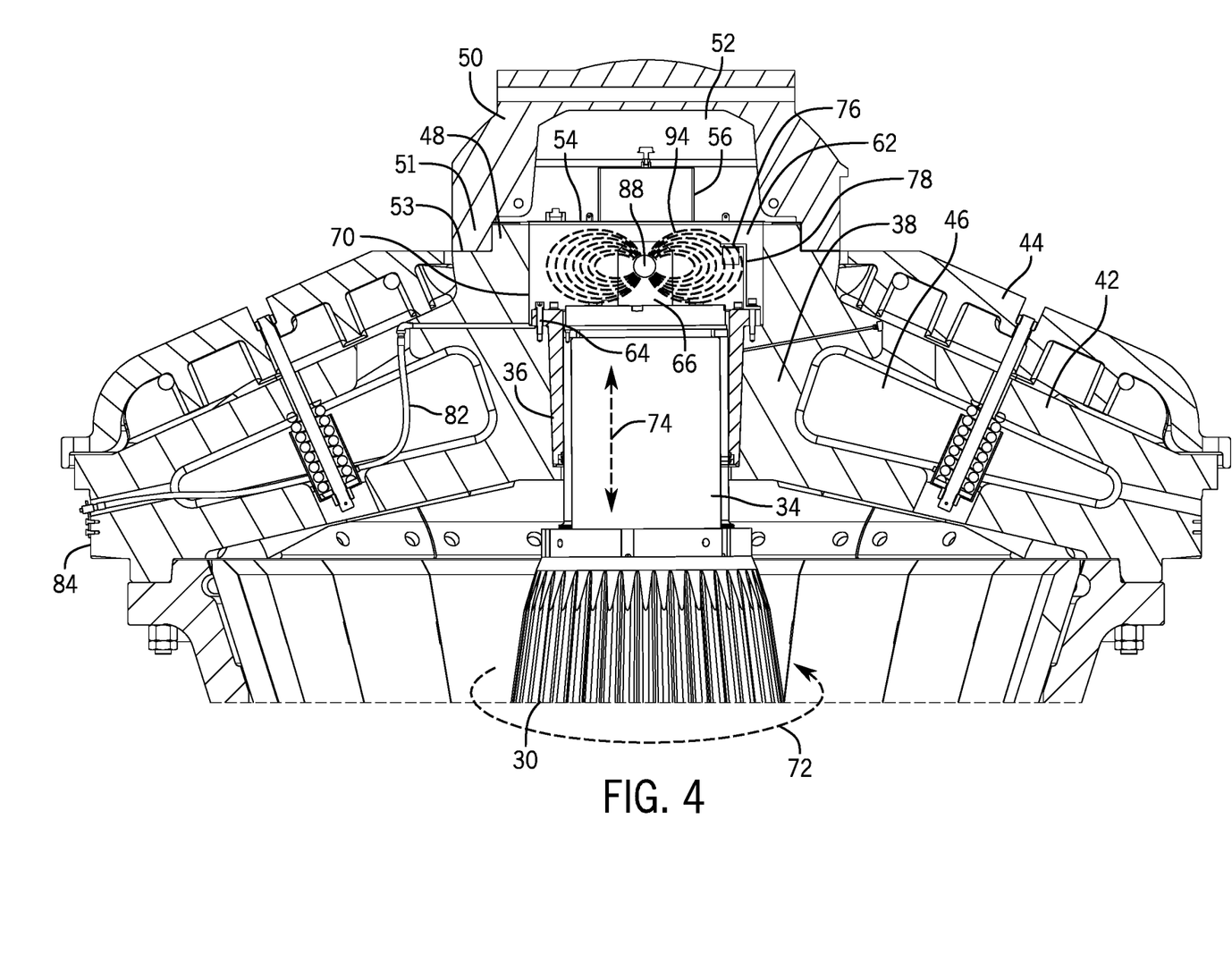
FIG. 4 is a section view through the spider and illustrating the location of the magnetic sensor and permanent magnet.

As best seen in FIGS. 2 and 3, the upper end 34 of the main shaft is supported within a spider bushing 36 that is contained within a central hub 38 of a spider 40. The spider 40 is mounted to the upper rim 41 of the upper top shell 14 and includes at least a pair of spider arms 42. As illustrated in FIG. 4, each of the spider arms 42 receives a spider arm shield 44 that provides wear protection for the underlying spider arm 42. Each of the spider arms 42 includes a generally hollow, open cavity 46. The spider arms 42 support the central hub 38 such that the central hub 38 can provide rotating support for the upper end 34 of the rotating main shaft 30.

Referring back to FIGS. 2 and 4, the center hub 38 includes a circular inner ridge 48 that helps to support a spider cap 50. The spider cap 50 includes an outer wall 51 that is supported on the shoulder 53 of the center hub 38. The spider cap 50 provides additional wear protection and creates a spider cap cavity 52. In the embodiment shown in FIG. 3, a metallic cover plate 54 is attached to the inner ridge 48 of the central hub 38. The cover plate 54 includes a cylindrical center section 56 that has a circular outer wall 58 extending upward from the cover plate 54. The outer wall 58 supports a top wall 60. The cover plate 54 is securely attached to the inner ridge 48 such that the cover plate 54 creates an enclosed spider bushing cavity 62.

As can be seen in FIGS. 3 and 4, the spider bushing 36 is secured to the central hub 38 by a series of connectors 64. The connectors 64 securely hold the spider bushing 36 in place while allowing the upper end 34 of the main shaft to both move vertically and rotate within the stationary central hub 38.

As can be seen in FIGS. 2 and 3, the upper end 34 of the main shaft receives a lifting lug 66 mounted to a top section 67. The lifting lug 66 and the top section 67 are attached to the upper end 34 of the main shaft and provide a point of attachment for the main shaft such that the entire main shaft can be lifted utilizing mechanical equipment, such as an overhead crane. The lifting lug 66 is formed from a ferromagnetic metal material that includes a lifting hole 68 that extends through the width of the lifting lug 66. The lifting hole 68 provides a point of attachment for lifting the entire main shaft during assembly of the gyratory crusher.

As can be seen in FIGS. 3 and 4, the lifting lug 66 is generally aligned with the center section 56 of the cover plate 54. In this manner, the lifting lug 66 is completely contained within the spider bushing cavity 62 defined by the cover plate 54 and the side walls 70 of the upper portion of the central hub 38 which terminate with the inner ridge 48. Since the central hub 38 and the cover plate 54 are both formed from ferromagnetic material, the spider bushing cavity 62 creates a "Faraday's cage" surrounding the lifting lug 66.

Referring now to FIG. 4, and in accordance with the present disclosure, the gyratory crusher includes a system for monitoring at least one motion parameter of the main shaft during operation. The monitoring system is able to detect both the rotational movement of the main shaft, as shown by arrow 72 in FIG. 4, and the vertical movement of the main shaft, as shown by arrow 74 also in FIG. 4. As best illustrated in FIG. 3, the sensing system includes a magnetic sensor 76 positioned within the spider bushing cavity 62. The magnetic sensor 76 is supported by a mounting bracket 78 which in turn is mounted through to the top end of the spider bushing 36 by a connector 80. A sensor cable 82 extends through the open cavity 46 of the spider arm 42 and out of the outer rim 84. The cable 82 is connected to a controller 86, which is shown in FIG. 1. The controller 86 receives the output signal from the magnetic sensor 76 and interprets the output signal from the magnetic sensor to monitor the rotational movement of the main shaft and the vertical movement of the main shaft in a manner as will be described in greater detail below.

In the preferred embodiment of the present disclosure, the magnetic sensor 76 is a stationary magnetometer that is operable to detect changes in the magnetic flux within the spider bushing cavity 62. A magnetometer is a special type of magnetic sensor that is able to measure the vector component of a magnetic field. The magnetometer generates an output signal that is based on the vector component of the magnetic field. If a magnetic member formed from a ferromagnetic material moves into the magnetic field near the stationary magnetometer, the ferromagnetic material will disrupt the magnetic field and create a change in the magnetic flux sensed by the magnetometer. The changes in the magnetic flux caused by the magnetic member can be interpreted to determine the direction of movement of the ferromagnetic member.

In the present disclosure, the magnetic member sensed by the magnetometer is the lifting lug 66. The lifting lug 66 is formed from a relatively large portion of ferromagnetic metallic material. During head spin or jumping of the main shaft, the lifting lug 66 will either rotates or move vertically within the spider bushing cavity 62. The movement of the lifting lug 66 is sufficient enough to disrupt the magnetic flux in a way that the magnetometer is able to identify either the rotational movement of the lifting lug or the vertical movement of the lifting lug. In an alternate embodiment in which the main shaft does not include the lifting lug 66, another mass of ferromagnetic material could be mounted to the top end of the main shaft. This mass of material would also be sensed by the magnetometer. As indicated previously, the spider bushing cavity 62 generally forms a "Faraday's cage" that prevents magnetic/electrical interference from impacting the reading made by the magnetometer. In this manner, only the movement of the lifting lug will be sensed by the magnetometer.

Figure 5:
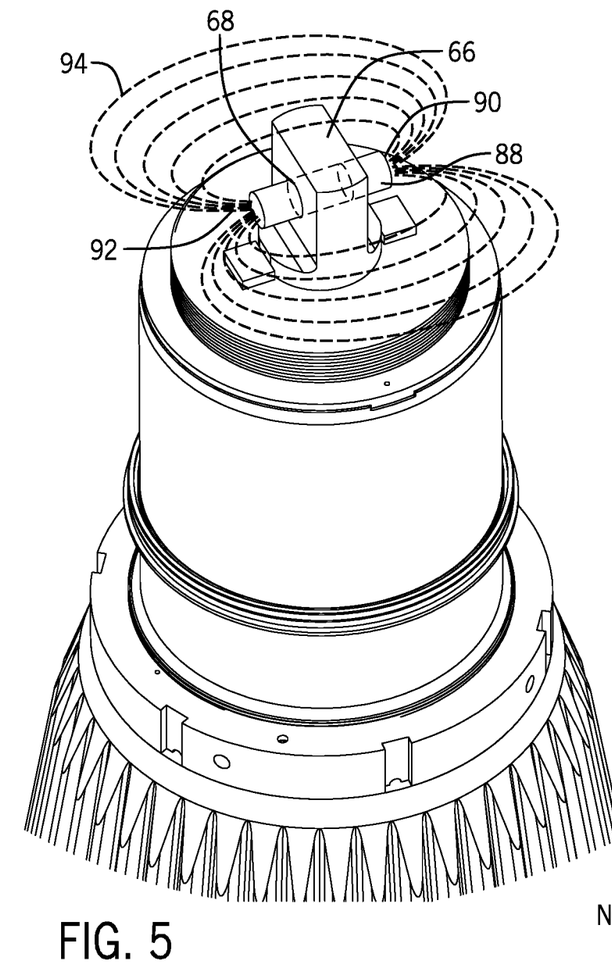
FIG. 5 is a perspective view showing the magnetic flux lines created by a permanent magnet.

Although sensing the rotational movement and the vertical movement of the lifting lug or similar magnetic member utilizing the magnetic sensor is one embodiment of the present disclosure, in another embodiment of the present disclosure, the magnetic member could be a permanent magnet 88 mounted to the top end of the main shaft. The permanent magnet 88 could be mounted alone or could be mounted to the mass of ferromagnetic material. In the embodiment illustrated, the permanent magnet 88 is inserted into the lifting hole 68 formed in the lifting lug 66, as best shown in FIG. 5. In the embodiment shown in FIG. 5, the permanent magnet 88 has a cylindrical form and extends from a first end 90 to a second end 92. As is well-known, the permanent magnet 88 creates a magnetic field 94 that extends between the first and second ends 90, 92. If the permanent magnet 88 is utilized, the permanent magnet 88 is installed after the main shaft 30 has been installed into the crusher and the lifting lug 66 is no longer needed during operation. The permanent magnet 88 could be removed later if the lifting lug 66 is needed for replacement or servicing.

As can be understood in FIG. 5, the magnetic field 94 created by the use of the permanent magnet 88 as the magnetic element enhances the magnetic field within the spider bushing cavity 62, as is clearly shown in FIG. 4. As illustrated in FIG. 4, the magnetic sensor 76 is positioned in close proximity to the permanent magnet 88 such that the magnetic field 94 can be easily sensed by the magnetic sensor 76. If the main shaft begins to rotate, as indicated by arrow 72, or moves vertically, as indicated by arrow 74, the change in the magnetic field created by the movement of the permanent magnet 88 will be sensed by the magnetic sensor 76. The change in the magnetic flux is sensed by the magnetic sensor 76 and an output signal is relayed to the controller 86 such that the controller 86 can provide indications to a user/operator that either vertical movement of the main shaft has been detected or rotational movement of the main shaft has been detected.

Figure 6:
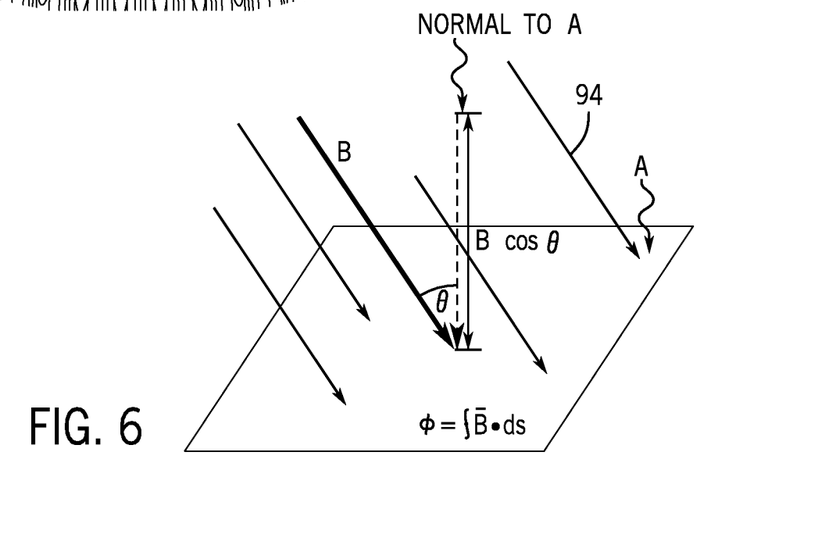
FIG. 6 is a schematic view illustrating the relationship between a magnetic field and magnetic flux.

FIG. 6 is an illustration of the relationship between the magnetic field 94 generated by the permanent magnet and magnetic flux. The relationship between the changing magnetic flux generated by a changing magnetic field is sensed by the magnetic sensor 76 and is used by the controller to determine whether there is vertical movement or rotational movement of the main shaft. Although a permanent magnet 88 is illustrated in the embodiment of the drawing figures, the permanent magnet 88 could be eliminated and the disruption to the magnetic flux sensed by the magnetic sensor 76 would be caused only by the ferrometallic material of the lifting lug 66. Such disruption could be sensed by the magnetic sensor and the analyzed by the controller. However, the use of the permanent magnet 88 is believed to create a stronger magnetic field which would make it easier to identify smaller changes in the magnetic flux.

Figure 7:
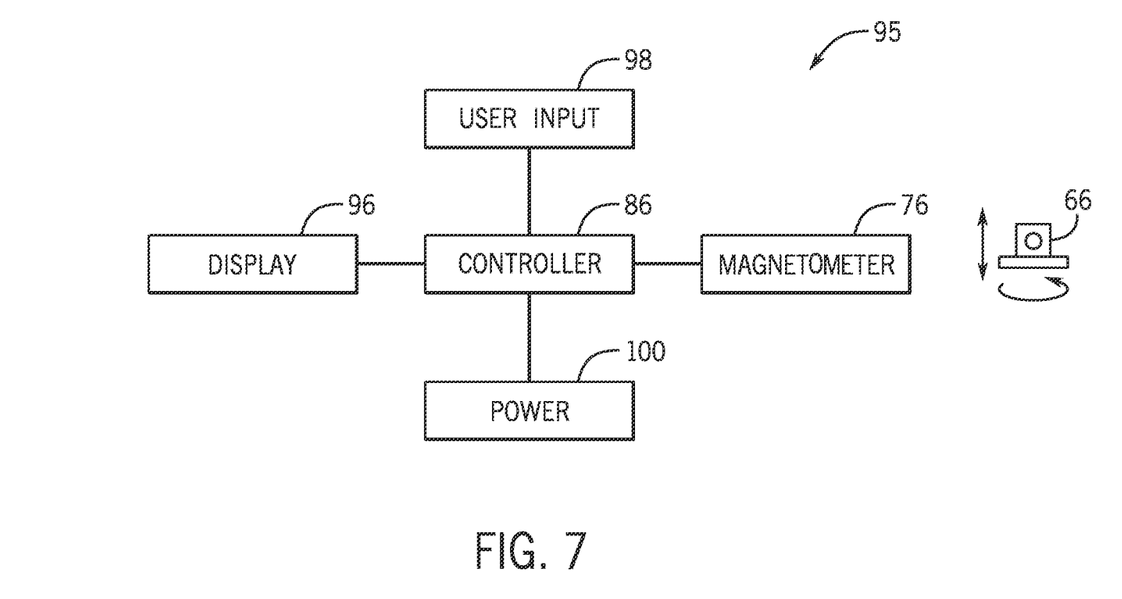
FIG. 7 is an electrical schematic illustration of the control system of the present disclosure.

FIG. 7 provides a schematic illustration of the sensing system 95 of the present disclosure. The sensing system 95 includes the controller 86 that is in communication with the magnetic sensor 76. The magnetic sensor 76 is positioned in close relationship to the magnetic element, such as the lifting lug 66 which may or may not include the permanent magnet. As indicated previously, the lifting lug 66 is movable both vertically and rotates depending upon the operation of the gyratory crusher and the associated main shaft. The magnetic sensor 76 senses the change in the magnetic flux caused by either the vertical movement or the rotational movement of the main shaft. The magnetic sensor 76 operates to create an electrical signal that is representative of the movement and change in the magnetic flux. The electrical signal generated by the magnetic sensor 76 is relayed to the controller 86. The controller 86, in turn, is programmed to interpret the changing electrical output signal from the magnetic sensor 76 and to generate an output signal that provides information as to either the rotational movement of the main shaft or the vertical movement of the main shaft. In the embodiment shown in FIG. 7, the controller 86 is connected to a visual display 96 such that the sensed information can be relayed to an operator/user. Although a display 96 is illustrated, it should be understood that the controller 86 could relay information to an operator/user in other manners, such as through visual indicators, audible indicators or any other manner that would be acceptable to the operator of the gyratory crusher.

In the embodiment shown in FIG. 7, a user input 98 is also connected to the controller 86 such that an operator/user can enter operational parameters and control values into the controller 86. The user input 98 could be any type of conventional user input, such as a keyboard, touchscreen, or any other type of input device that allows the user to enter information into the controller. The controller 86 is further connected to a power supply 100 that provides power for not only the controller 86 but also for the magnetic sensor 76. The power supply 100 could be a battery power supply or a utility power supply depending upon the location and configuration of the controller 86.

It is contemplated that the electrical signal from the magnetic sensor 76 will be provided to the controller 86 and the controller 86 can monitor for changes in the electrical signal from the magnetic sensor. The changes in the magnetic sensor electrical output signal provided to the controller will be indicative in changes in the magnetic flux caused by either the rotational movement of the lifting lug 66 or the vertical movement of the lifting lug. Based upon this information, the controller 86 will be able to determine whether the main shaft is moving vertically or rotating. It is contemplated that the magnetic sensor 76 will be arranged to operate whenever the crusher is powered on. Thus, during normal operation, the magnetic sensor 76 will be able to monitor the movement of the main shaft within the gyratory crusher. It is contemplated that the sensor 76 could be turned off depending upon the specific requirements and situation for operation of the gyratory crusher. However, the use of the magnetic sensor 76 will provide additional information as to the operational status and health of the gyratory crusher.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system for monitoring at least one motion parameter of a main shaft in a gyratory or cone crusher comprising:
   a spider bushing cavity defined by side walls and a cover plate, wherein the spider bushing cavity creates a Faraday's cage;
   a lifting lug mounted to a top end of the main shaft and located within the spider bushing cavity, wherein the lifting lug is formed of a ferromagnetic material capable of affecting a magnetic field;
   a magnetic sensor positioned within the spider bushing cavity in proximity to the lifting lug and operable to detect changes in a magnetic flux caused by movement of the lifting lug relative to the magnetic sensor; and a controller coupled to the magnetic sensor to determine the at least one motion parameter based on the detected changes in the magnetic flux.

2. The system of claim 1 wherein the lifting lug includes a permanent magnet secured to the lifting lug at the top end of the main shaft.

3. The system of claim 1 wherein the at least one motion parameter is head spin of the main shaft.

4. The system of claim 1 wherein the at least one motion parameter is vertical displacement of the main shaft.

5. The system of claim 1 wherein the controller is operable to determine the head spin of the main shaft and the vertical displacement of the main shaft.

6. A gyratory or cone crusher, comprising:
a main shaft;
a spider assembly having a spider bushing cavity defined by side walls and a cover plate, wherein the spider bushing cavity creates a Faraday's cage; and
a system for monitoring at least one motion parameter of the main shaft, comprising:
a lifting lug mounted to a top end of the main shaft and located within the spider bushing cavity, wherein the lifting lug is formed of a ferromagnetic material capable of affecting a magnetic field;
a magnetic sensor positioned within the spider bushing cavity in proximity to the lifting lug and operable to detect changes in a magnetic flux caused by movement of the lifting lug relative to the magnetic sensor; and
a controller coupled to the magnetic sensor to determine the at least one motion parameter based on the detected changes in the magnetic flux.

7. The crusher of claim 6 wherein the lifting lug includes a permanent magnet secured to the lifting lug.

8. The crusher of claim 6 wherein the at least one motion parameter is head spin of the main shaft.

9. The crusher of claim 6 wherein the at least one motion parameter is vertical displacement of the main shaft.

10. The crusher of claim 6 wherein the controller is operable to determine the head spin of the main shaft and the vertical displacement of the main shaft.

11. A method of determining the at least one movement parameter of a main shaft of a gyratory or cone crusher that includes a lifting lug mounted to a top end of the main shaft, the method comprising the steps of:
positioning the lifting lug within a spider bushing cavity that includes side walls and a cover plate, wherein the spider bushing cavity creates a Faraday's cage;
positioning a magnetic sensor within the spider bushing cavity in proximity to the lifting lug;
operating the magnetic sensor to detect changes in a magnetic flux as a result of movement of the lifting lug mounted to the top end of the main shaft relative to the magnetic sensor;
utilizing a controller to determine the at least one movement parameter; and
providing the at least one movement parameter to analyze movement of the main shaft.

12. The method of claim 11 wherein the at least one movement parameter includes the head spin of the main shaft and the vertical displacement of the main shaft.

13. The method of claim 11 wherein the magnetic sensor is a magnetometer.

14. The method of claim 11 further comprising the step of mounting a permanent magnet to the lifting lug such that the permanent magnet further changes the magnetic flux as a result of movement of the main shaft relative to the magnetic sensor.

\* \* \* \* \*